United States Patent
Ran

(10) Patent No.: US 9,607,297 B2
(45) Date of Patent: Mar. 28, 2017

(54) MOBILE PAYMENT VIA A VIRTUAL PERIPHERAL DEVICE

(75) Inventor: Alexander S. Ran, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 143 days.

(21) Appl. No.: 13/489,600

(22) Filed: Jun. 6, 2012

(65) Prior Publication Data

US 2013/0332293 A1    Dec. 12, 2013

(51) Int. Cl.
*G06Q 20/20* (2012.01)
*G06Q 20/32* (2012.01)

(52) U.S. Cl.
CPC ......... *G06Q 20/204* (2013.01); *G06Q 20/202* (2013.01); *G06Q 20/3274* (2013.01); *G06Q 20/3278* (2013.01)

(58) Field of Classification Search
CPC .. G06Q 20/20; G06Q 20/204; G06Q 20/3278; G06Q 20/32; G06Q 30/02; G06Q 20/322; G06Q 20/40; G06Q 20/202; G06F 3/017; G06F 3/013
USPC ......................................................... 705/17
See application file for complete search history.

(56) References Cited

U.S. PATENT DOCUMENTS

| | | | |
|---|---|---|---|
| 5,696,909 A | 12/1997 | Wallner | |
| 5,850,446 A | 12/1998 | Berger et al. | |
| 2008/0116264 A1 | 5/2008 | Hammad et al. | |
| 2008/0314971 A1 | 12/2008 | Faith et al. | |
| 2010/0191652 A1* | 7/2010 | Eckert et al. | 705/67 |
| 2011/0276420 A1* | 11/2011 | White et al. | 705/17 |
| 2012/0005076 A1* | 1/2012 | Dessert | G06Q 20/10 705/39 |
| 2012/0016731 A1* | 1/2012 | Smith et al. | 705/14.33 |
| 2012/0018511 A1* | 1/2012 | Hammad | 235/380 |
| 2012/0054046 A1* | 3/2012 | Albisu | G06Q 20/20 705/16 |
| 2012/0099780 A1 | 4/2012 | Smith et al. | |

(Continued)

OTHER PUBLICATIONS

Yu, Xiaofeng. Probabilistic Models for Information Extractions: From Cascaded Approarch to Joint Approach. Thesis in Systems Engineering and Engineering Mangement, The Chinese University of Hong Kong, Jun. 2010.*

*Primary Examiner* — F. Zeender
*Assistant Examiner* — Fawaad Haider
(74) *Attorney, Agent, or Firm* — Patterson & Sheridan, LLP

(57) ABSTRACT

During a financial transaction, a customer provides a token that identifies the customer to a peripheral device (which is other than a credit-authorization terminal or a magnetic-stripe reader) coupled to the point-of-sale terminal. Then, a unified point-of-sale service object executing on the point-of-sale terminal, which is a driver for a virtual peripheral device, performs one or more operations based on at least the token to obtain financial information associated with the customer. After providing the financial information and transaction information associated with the financial transaction to a financial institution specified in the financial information, the point-of-sale terminal receives a confirmation from the financial institution that the financial transaction has been completed. For example, the confirmation may be received via a credit-authorization-terminal service object that is a driver for the credit-authorization terminal.

17 Claims, 5 Drawing Sheets

(56) References Cited

U.S. PATENT DOCUMENTS

2012/0173348 A1* 7/2012 Yoo et al. .................. 705/16
2012/0173351 A1* 7/2012 Hanson et al. ............. 705/17

* cited by examiner

MOBILE PAYMENT VIA A VIRTUAL PERIPHERAL DEVICE

BACKGROUND

The present disclosure relates to a technique for conducting a financial transaction at a point-of-sale terminal.

The popularity and functionality of portable electronic devices has resulted in their use in an increasing variety of applications. For example, developers are investigating the use of cellular telephones to conduct financial transactions at point-of-sale terminals, such as cash registers.

Some proposals for these financial transactions (which are sometimes referred to as 'mobile payments') involve using a cellular telephone to provide financial information (such as financial information that is usually contained in a barcode or a magnetic stripe of a debit or credit card) directly to a point-of-sale terminal via an existing peripheral device that is coupled to the point-of-sale terminal, such as a barcode scanner or a magnetic-stripe reader. However, these approaches can significantly constrain the interaction with the customer during the mobile-payment process, which may hinder adoption of mobile payments.

Alternatively, in other proposals mobile-payments are implemented by changing existing point-of-sale-terminal hardware and/or software. However, these changes will significantly increase the cost and complexity of implementing mobile payments, and therefore may also restrict adoption of mobile payments.

SUMMARY

The disclosed embodiments relate to a point-of-sale terminal that conducts a financial transaction. During operation, the point-of-sale terminal receives a token associated with a customer via a peripheral device coupled to the point-of-sale terminal. This token identifies the customer, and the peripheral device is other than a credit-authorization terminal or a magnetic-stripe reader. Then, a unified point-of-sale service object executing on the point-of-sale terminal performs one or more operations based on at least the token to obtain financial information associated with the customer, where the unified point-of-sale service object is a driver for a virtual peripheral device. Moreover, the point-of-sale terminal provides the financial information and transaction information associated with the financial transaction to a financial institution specified in the financial information. Next, the point-of-sale terminal receives a confirmation from the financial institution that the financial transaction has been completed.

Note that the one or more operations may include: providing the token to a third party that is other than the financial institution; and receiving the financial information from the third party. For example, the token may be provided to the third party via a portable electronic device of the customer. Alternatively or additionally, the token may be provided to the third party via a network coupled to the point-of-sale terminal.

In some embodiments, prior to receiving the token, the point-of-sale terminal receives information initiating a secure session with the portable electronic device of the customer. This information may be conveyed using: wireless communication, near-field communication, an audio channel, and/or a video channel.

Furthermore, in some embodiments, prior to receiving the token the point-of-sale terminal provides a transaction request associated with the financial transaction from point-of-sale-terminal software executing on the point-of-sale terminal to the unified point-of-sale service object.

Additionally, note that providing the financial information and the transaction information associated with the financial transaction, and receiving the confirmation may occur via a credit-authorization-terminal service object which is a driver for the credit-authorization terminal. This credit-authorization-terminal service object may be compatible with a unified point-of-sale standard.

Another embodiment provides a method that includes at least some of the operations performed by the point-of-sale terminal.

Another embodiment provides a computer-program product for use with the point-of-sale terminal. This computer-program product includes instructions for at least some of the operations performed by the point-of-sale terminal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a point-of-sale terminal, a technique for conducting a financial transaction, and a computer-program product (e.g., software) for use with the point-of-sale terminal are described. During the financial transaction, a customer provides a token that identifies the customer to a peripheral device (which is other than a credit-authorization terminal or a magnetic-stripe reader) coupled to the point-of-sale terminal. For example, the customer may provide the token using a portable electronic device, such as a cellular telephone. Then, a unified point-of-sale service object executing on the point-of-sale terminal, which is a driver for a virtual peripheral device, performs one or more operations based on at least the token to obtain financial information associated with the customer. After providing the financial information and transaction information associated with the financial transaction to a financial institution specified in the financial information, the point-of-sale terminal receives a confirmation from the financial institution that the financial transaction has been completed. For example, the confirmation may be received via a credit-authorization-terminal service object that is a driver for the credit-authorization terminal.

By allowing the customer to conduct the financial transaction in a manner compatible with a unified point-of-sale standard, but without using a credit-authorization terminal or a magnetic-stripe reader, this financial technique may facilitate commercial activity. In particular, the financial technique may facilitate mobile payments via a portable electronic device (such as a cellular telephone) without requiring changes to point-of-sale-terminal hardware or software (i.e., in a way that is compatible with existing point-of-sale-terminal hardware and software), and without constraining the interaction with the customer during the mobile payments. In this way, the financial technique provides a software solution that can be broadly adopted with little or no expense or inconvenience for merchants or customers.

In the discussion that follows, a user or a customer may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
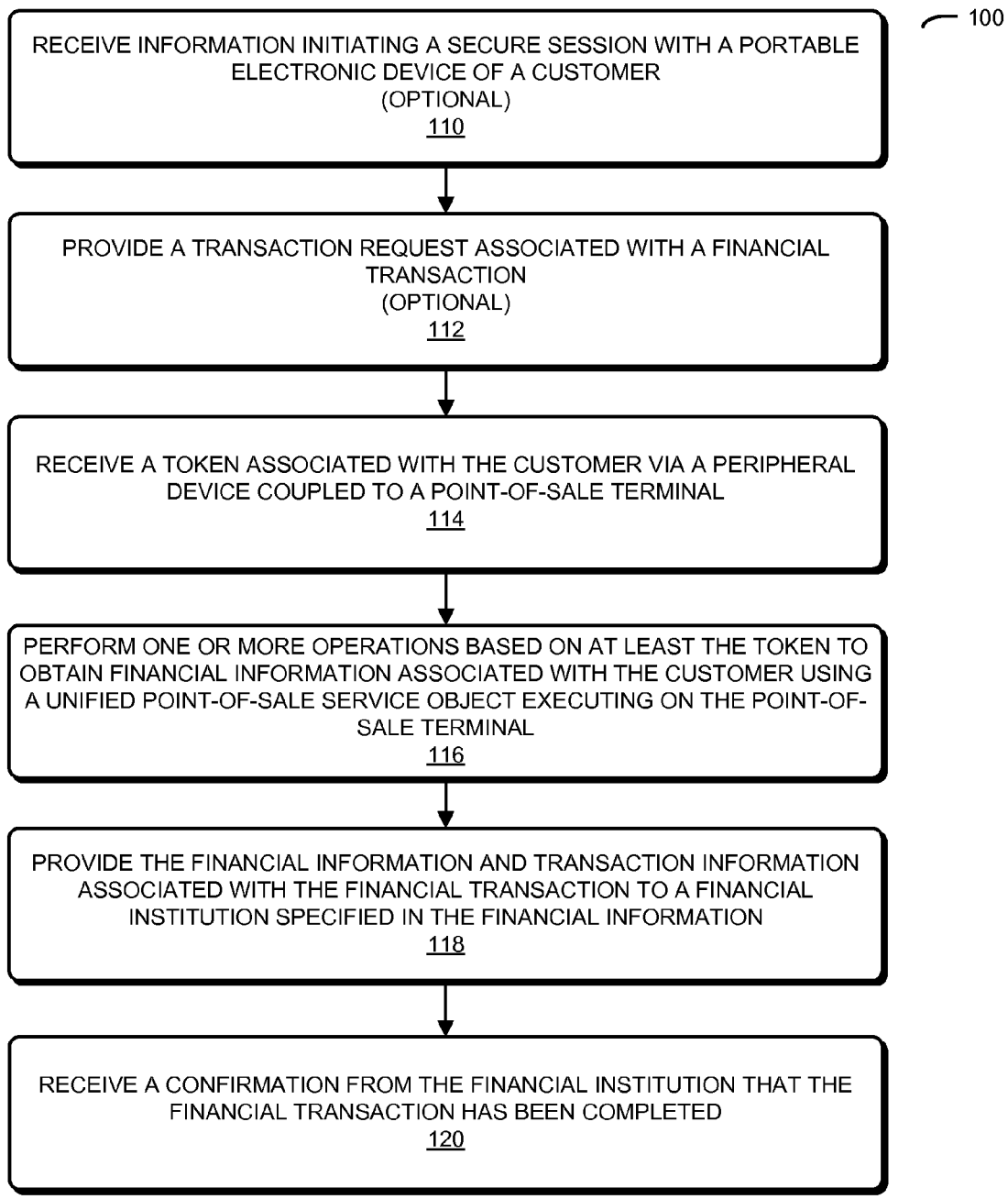
FIG. 1 is a flow chart illustrating a method for conducting a financial transaction in accordance with an embodiment of the present disclosure.
Figure 4:
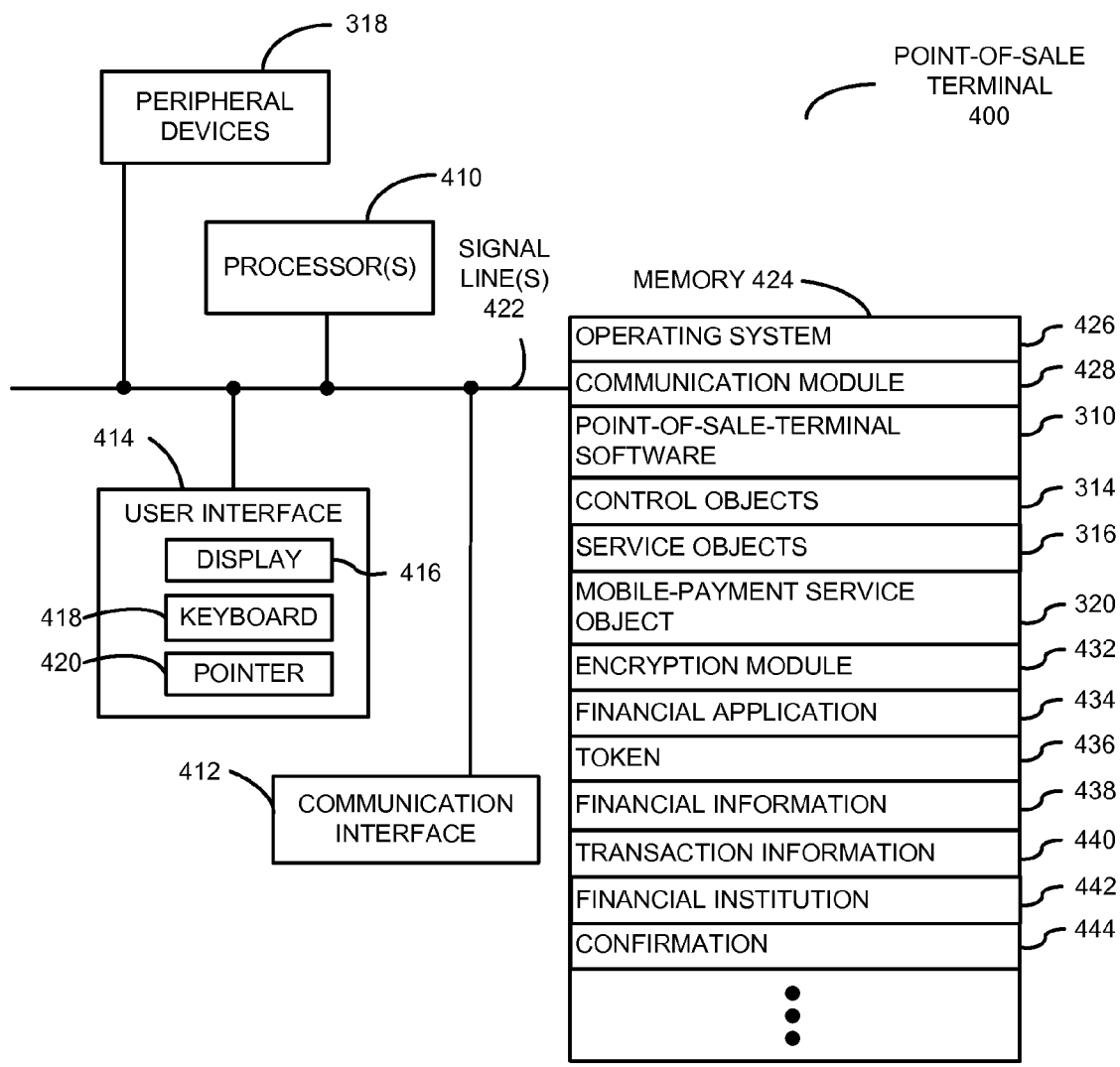
FIG. 4 is a block diagram illustrating a point-of-sale terminal that performs the method of FIGS. 1 and 2 in accordance with an embodiment of the present disclosure.

We now describe embodiments of the financial technique, which may be performed by a point-of-sale terminal (such as point-of-sale terminal 400 in FIG. 4). FIG. 1 presents a flow chart illustrating a method 100 for conducting a financial transaction. During operation, the point-of-sale terminal (such as a cash register) receives a token associated with a customer via a peripheral device coupled to the point-of-sale terminal (operation 114). This token identifies the customer, and the peripheral device is other than a credit-authorization terminal or a magnetic-stripe reader.

Then, a unified point-of-sale service object executing on the point-of-sale terminal performs one or more operations based on at least the token to obtain financial information associated with the customer (operation 116), where the unified point-of-sale service object is a driver for a virtual peripheral device. (The unified point-of-sale service object is sometimes referred to as a 'virtual mobile payment peripheral.') As described below with reference to FIG. 2, the one or more operations may include: providing the token to a third party that is other than the financial institution; and receiving the financial information from the third party. For example, the token may be provided to the third party via a portable electronic device of the customer. Alternatively or additionally, the token may be provided to the third party via a network coupled to the point-of-sale terminal.

Moreover, the point-of-sale terminal provides the financial information and transaction information associated with the financial transaction to a financial institution specified in the financial information (operation 118). Next, the point-of-sale terminal receives a confirmation from the financial institution that the financial transaction has been completed (operation 120). For example, providing the financial information and the transaction information associated with the financial transaction (operation 118), and receiving the confirmation (operation 120) may occur via a credit-authorization-terminal service object which is a driver for the credit-authorization terminal. This credit-authorization-terminal service object, as well as the virtual mobile payment peripheral, may be compatible with a unified point-of-sale standard, such as the UnifiedPOS or UPOS standard (from the National Retail Federation of Washington, D.C.).

In some embodiments, prior to receiving the token (operation 114), the point-of-sale terminal optionally receives information initiating a secure session with the portable electronic device of the customer (operation 110) at the start of the financial transaction. This information may be conveyed using: wireless communication, near-field communication, an audio channel, and/or a video channel.

Furthermore, in some embodiments, prior to receiving the token (operation 114) the point-of-sale terminal optionally provides a transaction request associated with the financial transaction (operation 112) from point-of-sale-terminal software executing on the point-of-sale terminal to the unified point-of-sale service object. In response to this transaction request, the unified point-of-sale service object may await the token from the peripheral device.

Figure 2:
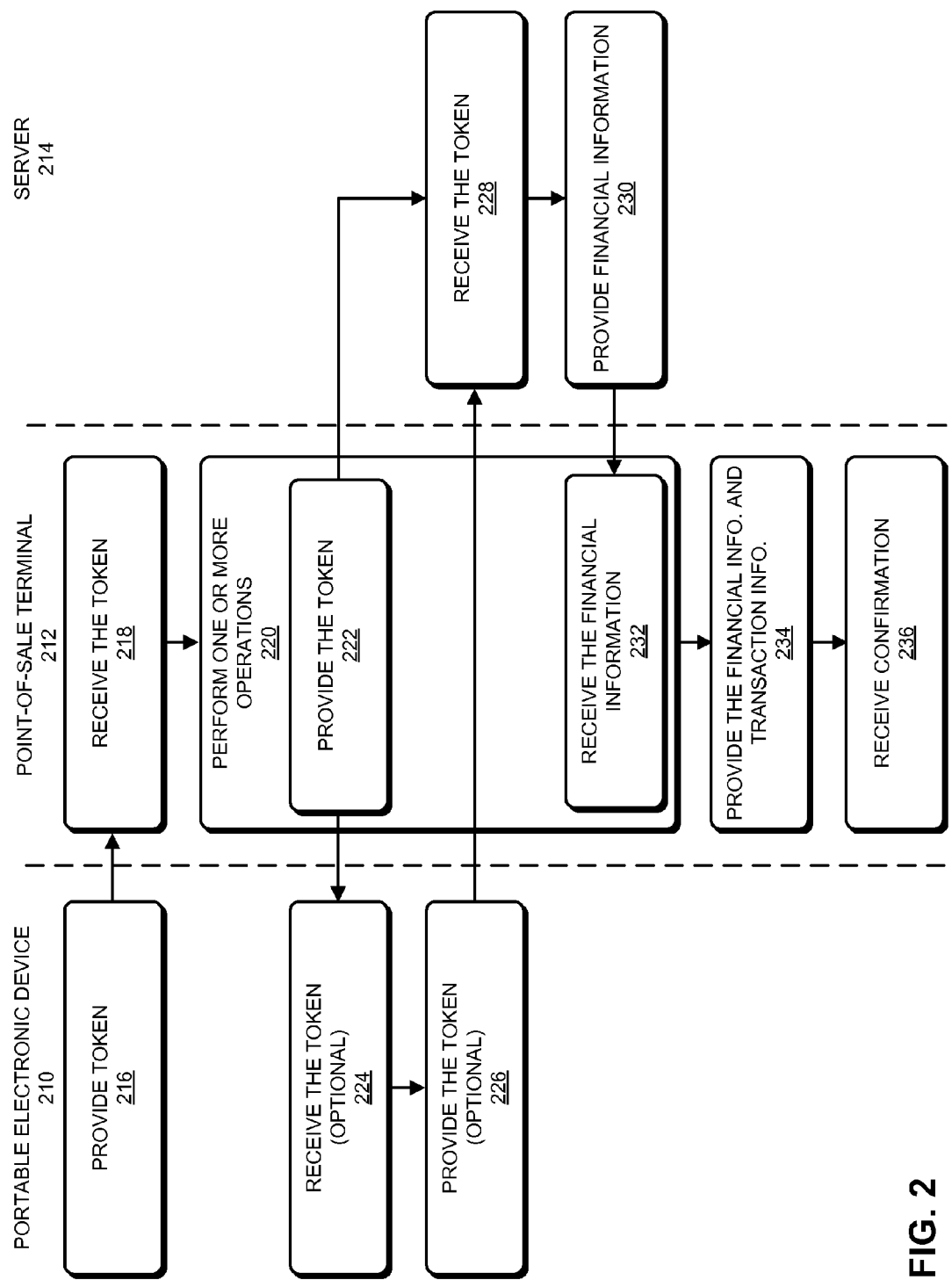
FIG. 2 is a drawing illustrating the method of FIG. 1 in accordance with an embodiment of the present disclosure.

In an exemplary embodiment, the financial technique is implemented using the portable electronic device, the point-of-sale terminal and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of portable electronic device 210 provides the token (operation 216) that identifies the user. For example, the user may be a customer, and portable electronic device 210 may be a cellular telephone. In these embodiments, the token may be conveyed using: wireless communication, near-field communication, an audio channel, and/or a video channel. Alternatively, the user may enter the token into a keypad or portable electronic device 210 may display or provide an image of a barcode that includes a spatial pattern corresponding to the token.

After receiving the token (operation 218) via the peripheral device (such as a wireless receiver, a barcode scanner or the keypad), the unified point-of-sale service object executing on point-of-sale terminal 212 performs the one or more operations (operation 220) based on at least the token to obtain financial information associated with the customer. (As described further below with reference to FIG. 3, the unified point-of-sale service object may be the driver for the virtual peripheral device.) For example, the token may be provided to server 214 associated with the third party (which may be other than the financial institution that will make payment for the customer in the financial transaction), such as a provider of the financial technique. In particular, point-of-sale terminal 212 may provide the token (operation 222) to server 214 via a network. Alternatively, the token may be optionally provided (operation 222) to server 214 via portable electronic device 210 (operations 224 and 226).

Moreover, after receiving the token (operation 228), server 214 may access and provide the financial information (operation 230) to point-of-sale terminal 212. For example, the financial information may include mobile-payment information for the customer, such as: an account identifier, an available amount that can be spent, a financial institution (such as a bank), etc.

Furthermore, after receiving the financial information (operation 232), point-of-sale terminal 212 provides the financial information and the transaction information (operation 234) associated with the financial transaction to the financial institution specified in the financial information. For example, the transaction information may include: a transaction day/time, a merchant identifier, a product code and a transaction amount.

Note that the financial information and the transaction information may be received by a server associated with the financial institution (not shown), which then completes the financial transaction (for example, by making payment on behalf of the consumer to the merchant associated with point-of-sale terminal 212). After the financial transaction is complete (not shown), this server may provide the confirmation that the financial transaction has been completed (not shown). Alternatively, the financial information and the transaction information may be received by server 214 (not shown), which then completes the financial transaction (not shown) and provides the confirmation (not shown).

Then, point-of-sale terminal 212 receives the confirmation (operation 236). For example, the confirmation may be received via a credit-authorization-terminal service object which is a driver for the credit-authorization terminal coupled to point-of-sale terminal 212.

In some embodiments of method 100 (FIGS. 1 and 2), there may be additional or fewer operations. Moreover, the order of the operations may be changed, and/or two or more operations may be combined into a single operation.

In an exemplary embodiment, the financial technique leverages the UPOS standard to integrate mobile payments with point-of-sale-terminal software. Most commercially available point-of-sale-terminal software (such as point-of-sale operating systems) supports the UPOS standard, which covers integration of peripheral devices, such as: a credit-authorization terminal, a magnetic-stripe reader, etc. The UPOS architecture is based on the concept of control objects and service objects. During operation of a point-of-sale terminal, the point-of-sale-terminal software interacts with one or more control objects for tasks such as credit-payment authorization. A control object connects to the appropriate service object that serves the role of a driver for an external or peripheral device that performs the task(s) and returns the result. For example, in the case of the credit-payment authorization, the credit-authorization-terminal service object is the driver for the credit-authorization terminal.

In the financial technique, mobile payments are integrated with the point-of-sale-terminal software by using a service object to drive a virtual peripheral device. Thus, instead of using a service object to drive an actual peripheral device, a service object becomes a virtual peripheral device itself while implementing the logic necessary to complete a task (in this case, the financial transaction). This logic may include interacting directly with the user's portable electronic device and/or with a server associated with the third party that facilitates or provides the financial technique (including providing the financial information in response to receiving the token from the point-of-sale terminal). In this way, the standard point-of-sale peripheral integration interface may be used to enable a software-only solution that facilitates mobile payments that work with a majority of existing point-of-sale-terminal software and hardware.

In an exemplary embodiment, a customer wants to purchase a product or a service from a merchant. A cashier at a point-of-sale terminal may ring up the purchased item(s). The cashier may also optionally invoke a barcode-scanner operation, such as that normally used for a store loyalty card. In response, the point-of-sale-terminal software may submit a transaction request to a virtual barcode scanner (i.e., the unified point-of-sale service object) that is provided by a provider of the financial technique. In response to this transaction request, the virtual barcode scanner may await the token from the peripheral device (such as a barcode scanner).

Then, the customer may optionally perform an operation for session creation (i.e., an operation that initiates a session). For example, session creation may involve: a near-field-communication 'tap,' or audio or video signal transmission or reception that initiates a proximity connection with the unified point-of-sale service object on the point-of-sale terminal. This communication between the portable electronic device and the point-of-sale terminal may use BlueTooth® (from the BlueTooth Special Interest Group of Kirkland, Wash.) and/or WiFi™ (from the WiFi Alliance of Austin, Tex.).

Next, a mobile-payment application executing on the portable electronic device (which may also be provided by the provider of the financial technique) provides a token (such as a numerical identifier) to the barcode-scanner service object on the point-of-sale terminal. This token identifies the user either to the merchant and/or to the provider of the financial technique (who may be accessible to all service objects executing on the point-of-sale terminal via a secure data connection). After receiving the financial information from the merchant and/or the provider, the barcode-scanner service object returns the financial information associated with the user to the point-of-sale-terminal software.

In some embodiments, the cashier optionally performs additional operations for awarding loyalty points, redeeming coupons and offers, etc.

Furthermore, after receiving the financial information, the cashier may perform a credit-authorization operation for the amount due using the credit-authorization-terminal service object. In response, the point-of-sale-terminal software makes a corresponding request to the credit-authorization-terminal service object.

Additionally, the credit-authorization-terminal service object interacts with the mobile-payment application on the user's portable electronic device and/or with server 214 (FIG. 2) to obtain payment authorization from both the consumer and the payment processor (such as the financial institution). This authorization is passed back to the point-of-sale-terminal software. In some embodiments, the point-of-sale-terminal software optionally prints a receipt using a UPOS printer service object that passes receipt information to the mobile-payment application and/or to server 214 (FIG. 2).

By using a substitute unified point-of-sale service object, such as the virtual barcode scanner (as opposed to the credit-authorization terminal or the magnetic-stripe reader, and, more generally, hardware that scans a credit or a debit card and receives authorization), which can connect to server 214 (FIG. 2) associated with the provider of the financial technique, the financial technique may facilitate mobile payments.

Note that a variety of communication techniques may be used to provide a connection between the mobile-payment application and the unified point-of-sale service object, including: proximity communication (such as BlueTooth® and/or WiFi™), audio communication, video communication, near-field communication, and/or a wireless area network (for example, in embodiments where the portable electronic device and the point-of-sale terminal have access to a wireless area network or Internet protocol).

Figure 3:
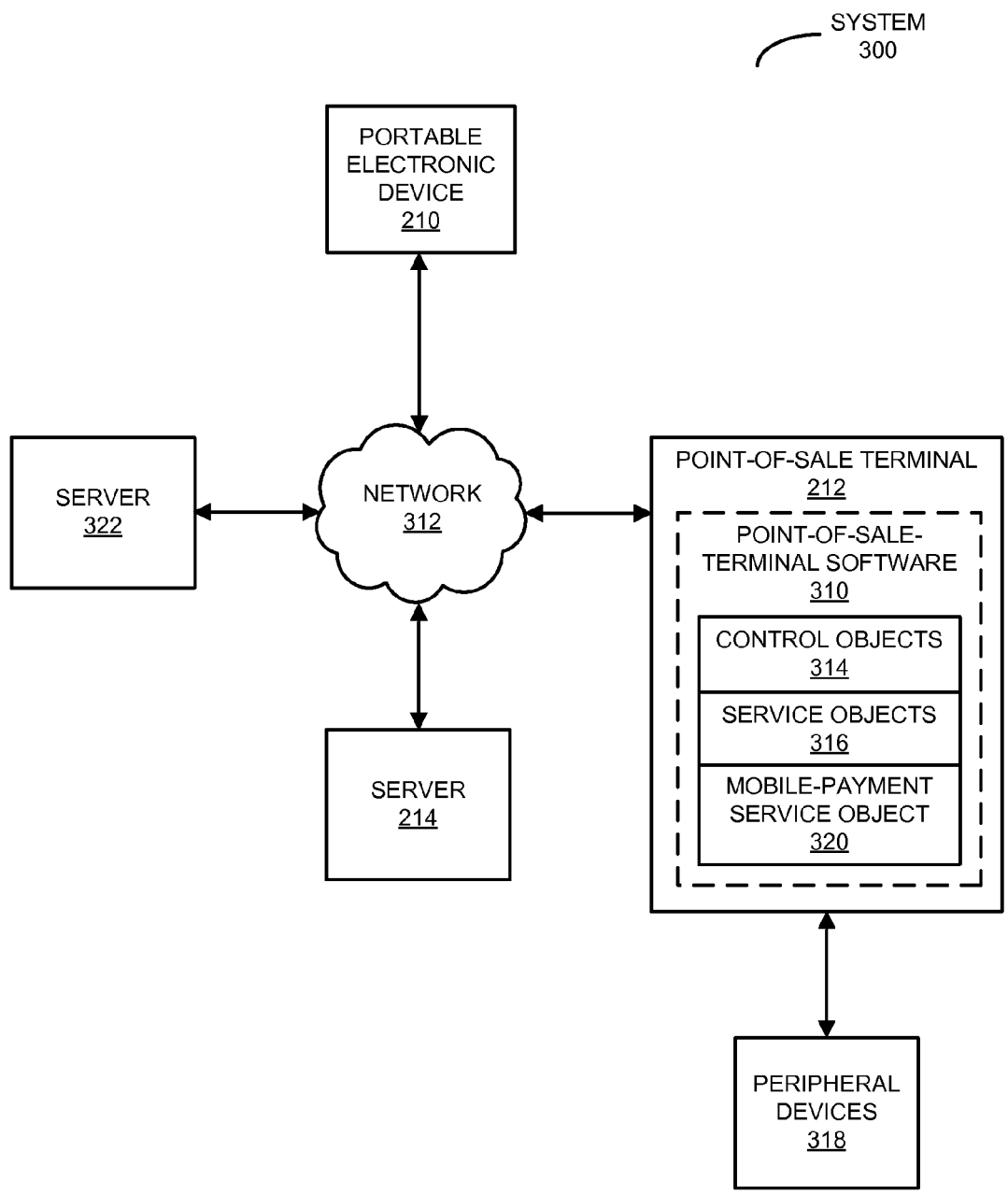
FIG. 3 is a block diagram illustrating a system that performs the method of FIGS. 1 and 2 in accordance with an embodiment of the present disclosure.

We now describe embodiments of the system and the point-of-sale terminal, and their use. FIG. 3 presents a block diagram illustrating a system 300 that performs method 100 (FIGS. 1 and 2). In this system, a user of portable electronic device 210 may use a software product (for example, the mobile-payment application), such as a software application that is resident on and that executes on portable electronic device 210. (Alternatively, the user may interact with a web page that is provided by server 214 via network 312, and which is rendered by a web browser on portable electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on portable electronic device 210 (such as a software application that is provided by server 214 or that is installed and which executes on portable electronic device 210).

As discussed previously, during a financial transaction (such as purchasing a product from a merchant), the user (who is the customer in the preceding discussion) may use the software application to provide a token (which identifies the user) from portable electronic device 210 to point-of-sale terminal 212 via network 312. As shown in FIG. 3, point-of-sale-terminal software 310 may include control objects 314 (such as a credit-authorization-terminal control object, a magnetic-stripe-reader control object, an electronic-money-transfer control object, etc.) that interface via a UPOS standard peripheral interface with drivers or service objects 316 (such as a credit-authorization-terminal service object, a magnetic-stripe-reader service object, an electronic-money-transfer service object, etc.) for peripheral devices 318 (such as a credit-authorization terminal, a magnetic-stripe reader, etc.). The token may be received by a UPOS service object such as mobile-payment service object 320 (for example, the virtual barcode scanner), which is a driver for a virtual peripheral device.

After receiving the token, mobile-payment service object 320 performs one or more operations based on at least the token to obtain financial information associated with the user. For example, mobile-payment service object 320 may provide the token to server 214 via network 312 either directly or via portable electronic device 210, and server 214 may use the customer specified by the token to access and return the financial information to mobile-payment service object 320 and, thus, point-of-sale terminal 212.

Then, point-of-sale terminal 212 may provide the financial information and the transaction information associated with the financial transaction to a financial institution specified in the financial information. For example, the credit-authorization-terminal control object may provide the financial information and the transaction information to the credit-authorization-terminal service object, which in turn drives the credit-authorization terminal that provides the financial information and the transaction information via network 312 to server 214 or server 322 (which is associated with the financial institution). Thus, the financial information and the transaction information may be directly provided to the financial institution that completes the financial transaction or it may be provided first to the provider of the financial technique (via server 214), which interacts with server 322 via network 312 to complete the financial transaction.

Next, point-of-sale terminal 212 receives a confirmation from the financial institution that the financial transaction has been completed. This confirmation may be received directly from server 322 via network 312 or indirectly from server 214 via network 312.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

FIG. 4 presents a block diagram illustrating a point-of-sale terminal 400 that performs method 100 (FIGS. 1 and 2), such as point-of-sale terminal 212 (FIGS. 2 and 3). Point-of-sale terminal 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in point-of-sale terminal 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to point-of-sale terminal 400.

Memory 424 may also include multiple program modules (or sets of instructions), including: point-of-sale-terminal software 310 (or a set of instructions), control objects 314 (or a set of instructions), service objects 316 (or a set of instructions), mobile-payment service object 320 (or a set of instructions), encryption module 432 (or a set of instructions) and/or financial application 434 (or a set of instructions). Note that one or more of these program modules (or sets of instructions) may constitute a computer-program mechanism.

During the financial transaction in method 100 (FIGS. 1 and 2), mobile-payment service object 320 receives a token 436 from a customer. Then, mobile-payment service object 320 performs one or more operations based on at least token 436 to obtain financial information 438 associated with the customer. For example, mobile-payment service object 320 may directly or indirectly provide token 436 to server 214 (FIGS. 2 and 3) using communication module 428 and communication interface 412, and in response mobile-payment service object 320 may receive financial information 438 from server 214 (FIGS. 2 and 3).

Figure 5:
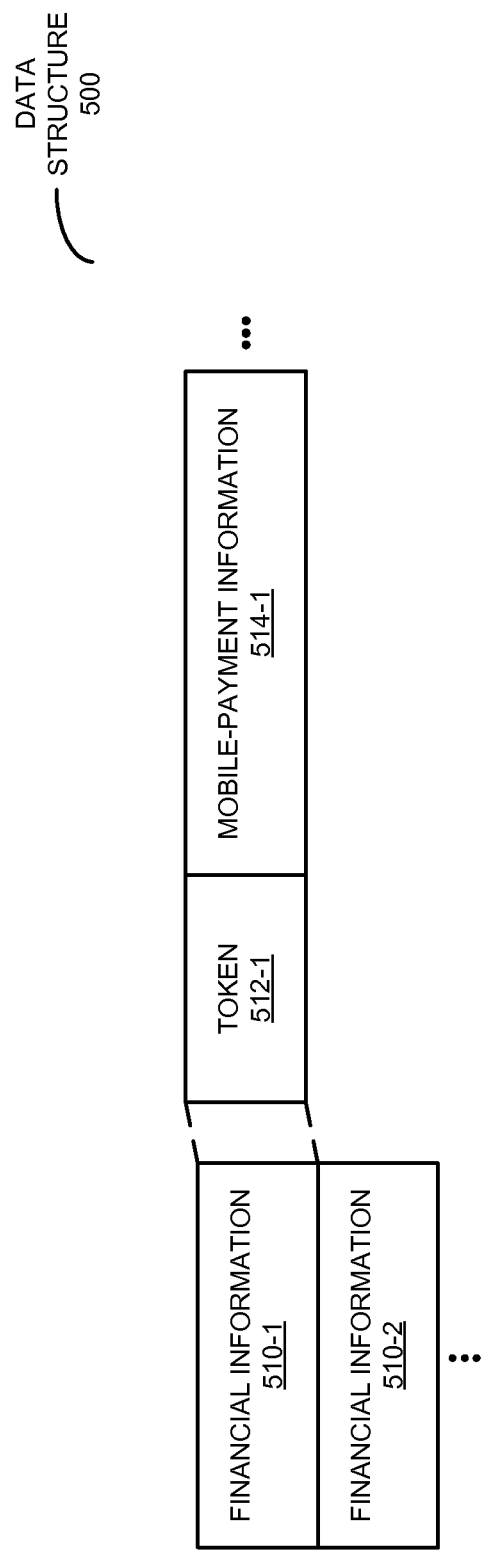
FIG. 5 is a block diagram illustrating a data structure for use in the point-of-sale terminal of FIG. 4 in accordance with an embodiment of the present disclosure.

Alternatively, financial information 438 may be stored on point-of-sale terminal 400 and may be accessed using token 436. For example, token 436 may be associated with a loyalty program, and financial information 438 may have been previously provided by the customer when their loyalty account was set up. In some embodiments, this look-up operation uses a data structure that stores financial information associated with customers. This is shown in FIG. 5, which presents a data structure 500 that includes financial information 510. In particular, financial information 510-1 may include: token 512-1 and mobile-payment information 514-1 (such as an account identifier, an available amount that can be spent, a financial institution, etc.).

Referring back to FIG. 4, point-of-sale terminal 400 may directly or indirectly provide financial information 438 and transaction information 440 associated with the financial transaction to a financial institution 442 specified in financial information 438. Next, point-of-sale terminal 400 directly or indirectly receives a confirmation 444 from financial institution 442 that the financial transaction has been completed.

Because information in point-of-sale terminal 400 may be sensitive in nature, in some embodiments at least some of the data stored in memory 424 and/or at least some of the data communicated using communication module 428 is encrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although point-of-sale terminal 400 is illustrated as having a number of discrete items, FIG. 4 is intended to be a functional description of the various features that may be present in point-of-sale terminal 400 rather than a structural schematic of the embodiments described herein. In practice, and as recognized by those of ordinary skill in the art, the functions of point-of-sale terminal 400 may be distributed over a large number of servers or computers, with various groups of the servers or computers performing particular subsets of the functions. In some embodiments, some or all of the functionality of point-of-sale terminal 400 may be implemented in one or more application-specific integrated circuits (ASICs) and/or one or more digital signal processors (DSPs).

Point-of-sale terminals (such as point-of-sale terminal 400), as well as computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

In some embodiments one or more of the modules in memory 424 may be associated with and/or included in a financial application 434. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application 434 may be associated with and/or include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

System 300 (FIG. 3), point-of-sale terminal 400 (FIG. 4) and/or data structure 500 may include fewer components or additional components. Moreover, two or more components may be combined into a single component, and/or a position of one or more components may be changed. In some embodiments, the functionality of system 300 (FIG. 3) and/or point-of-sale terminal 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A point-of-sale-terminal-implemented method for conducting a financial transaction, the method comprising:

initiating, at a point-of-sale terminal, a secure session with a portable electronic device of a customer using at least one of wireless communication, near-field communication, an audio channel, or a video channel, wherein a point-of-sale terminal software executing on the point-of-sale terminal supports a unified point-of-sale (UPOS) standard, wherein the UPOS standard provides for integration of peripheral devices of the point-of-sale terminal;

providing a transaction request associated with the financial transaction from the point-of-sale-terminal software executing on the point-of-sale terminal to a UPOS service object as defined by the UPOS standard;

receiving, at the point-of-sale terminal, a token from the portable electronic device, wherein the token identifies the customer and the token is received using a UPOS service object executing on the point-of-sale terminal, and wherein instead of using the UPOS service object to drive an actual physical peripheral device for which the UPOS service object was intended to drive, the UPOS service object acts as a virtual peripheral device driver for a virtual peripheral device while implementing logic required to complete the financial transaction;

using the UPOS service object executing on the point-of-sale terminal, obtaining financial information associated with the customer based on the identification of the customer by the token;

providing the financial information and transaction information associated with the financial transaction to a financial institution specified in the financial information; and receiving a confirmation from the financial institution that the financial transaction has been completed, wherein providing the financial information and the transaction information associated with the financial transaction, and receiving the confirmation occur via a credit-authorization-terminal service object which is a driver for the credit-authorization terminal, and wherein the credit-authorization-terminal service object is compatible with the UPOS standard.

2. The method of claim 1, wherein the one or more operations include: providing the token to a third party, wherein the third party is other than the financial institution; and receiving the financial information from the third party.

3. The method of claim 2, wherein the token is provided to the third party via a portable electronic device of the customer.

4. The method of claim 2, wherein the token is provided to the third party via a network coupled to the point-of-sale terminal.

5. The method of claim 1, wherein the information is conveyed using one of: wireless communication, near-field communication, an audio channel, and a video channel.

6. A computer-program product for use in conjunction with a point-of-sale terminal, the computer-program product comprising a non-transitory computer-readable storage medium and a computer-program mechanism embedded therein, to conduct a financial transaction, the computer-program mechanism including:
 instructions for initiating, at a point-of-sale terminal, a secure session with a portable electronic device of a customer using at least one of wireless communication, near-field communication, an audio channel, or a video channel, wherein a point-of-sale terminal software executing on the point-of-sale terminal supports a unified point-of-sale (UPOS) standard, wherein the UPOS standard provides for integration of peripheral devices of the point-of-sale terminal;
 instructions for providing a transaction request associated with the financial transaction from point-of-sale-terminal software executing on the point-of-sale terminal to a UPOS object as defined by the UPOS standard;
 instructions for receiving, at the point-of-sale terminal, a token from the portable electronic device, wherein the token identifies the customer and the token is received using the UPOS object executing on the point-of-sale terminal, and wherein instead of using the UPOS service object to drive an actual physical peripheral device for which the UPOS service object was intended to drive, the UPOS service object acts as a virtual peripheral device drive for a virtual peripheral device while implementing logic required to complete the financial transaction;
 instructions for using the UPOS service object executing on the point-of-sale terminal to obtaining financial information associated with the customer based on the identification of the customer by the token;
 instructions for providing the financial information and transaction information associated with the financial transaction to a financial institution specified in the financial information; and
 instructions for receiving a confirmation from the financial institution that the financial transaction has been completed, wherein providing the financial information and the transaction has been completed, wherein providing the financial information and the transaction information associated with the financial transaction, and receiving the confirmation occur via a credit-authorization-terminal service object which is a driver for the credit-authorization terminal, and wherein the credit-authorization-terminal service object is compatible with the unified point-of-sale standard.

7. The computer-program product of claim 6, wherein the one or more operations include:
 providing the token to a third party, wherein the third party is other than the financial institution; and
 receiving the financial information from the third party.

8. The computer-program product of claim 7, wherein the token is provided to the third party via a portable electronic device of the customer.

9. The computer-program product of claim 7, wherein the token is provided to the third party via a network coupled to the point-of-sale terminal.

10. The computer-program product of claim 6, wherein the information is conveyed using one of; wireless communication, near-field communication, an audio channel, and a video channel.

11. A point-of-sale terminal, comprising: a processor; memory; and
 a program module, wherein the program module is stored in the memory and configurable to be executed by the processor to conduct a financial transaction, the program module including:
 instructions for initiating, at a point-of-sale terminal, a secure session with a portable electronic device of a customer using at least one of wireless communication, near-field communication, an audio channel, or a video channel, wherein a point-of-sale terminal software executing on the point-of-sale terminal supports a unified point-of-sale (UPOS) standard, wherein the UPOS standard provides for integration of peripheral devices of the point-of-sale terminal;
 instructions for providing a transaction request associated with the financial transaction form the point-of-sale-terminal software executing on the point-of-sale terminal to the UPOS service object as defined by the UPOS standard;
 instructions for receiving at the point-of-sale terminal, a token from the portable electronic device, wherein the token identifies the customer and the token is received using a UPOS service object executing on the point-of-sale executing on the point-of-sale terminal, and wherein instead of using the UPOS service object to drive an actual physical peripheral device for which the UPOS service object was intended to drive, the UPOS service object acts as a virtual peripheral device drive for a virtual peripheral device while implementing logic required to complete the financial transaction;
 instructions for using the UPOS service object executing on the point-of-sale terminal to obtaining financial information associated with the customer based on the identification of the customer by the token;
 instructions for providing the financial information and transaction information associated with the financial transaction to a financial institution specified in the financial information; and
 instructions for receiving a confirmation from the financial institution that the financial transaction has been completed, wherein providing the financial information and the transaction information associated with the financial transaction, and receiving the confirmation occur via credit-authorization-terminal service object which is a driver for the credit-authorization terminal, and wherein the credit-authorization-terminal device object is compatible with the UPOS standard.

12. The point-of-sale terminal of claim 11, wherein the one or more operations include:
 providing the token to a third party, wherein the third party is other than the financial institution; and
 receiving the financial information from the third party.

13. The point-of-sale terminal of claim 12, wherein the token is provided to the third party via a portable electronic device of the customer.

14. The point-of-sale terminal of claim 12, wherein the token is provided to the third party via a network coupled to the point-of-sale terminal.

15. The method of claim 1, wherein the token is communicated between the point-of-sale terminal and the portable electronic device using near-field communication.

16. The computer-program product of claim 6, wherein the token is communicated between the point-of-sale terminal and the portable electronic device using near-field communication.

17. The point-of-sale terminal of claim 11, wherein the token is communicated between the point-of-sale terminal and the portable electronic device using near-field communication.

* * * * *